United States Patent
DeCusatis et al.

(10) Patent No.: US 9,571,410 B2
(45) Date of Patent: Feb. 14, 2017

(54) CREDIT-BASED LINK LEVEL FLOW CONTROL AND CREDIT EXCHANGE USING DCBX

(71) Applicant: International Business Machines Corporation, Armonk, NY (US)

(72) Inventors: Casimer M. DeCusatis, Poughkeepsie, NY (US); Mircea Gusat, Langnau (CH); Keshav G. Kamble, Fremont, CA (US); Cyriel J. Minkenberg, Gutenswil (CH); Vijoy A. Pandey, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 13/859,655

(22) Filed: Apr. 9, 2013

(65) Prior Publication Data
US 2014/0301187 A1    Oct. 9, 2014

(51) Int. Cl.
*H04L 12/801* (2013.01)
*H04L 12/855* (2013.01)

(52) U.S. Cl.
CPC ........... *H04L 47/39* (2013.01); *H04L 47/2466* (2013.01)

(58) Field of Classification Search
CPC .................. H04L 47/2466; H04L 47/39
USPC ........................................... 370/230
See application file for complete search history.

(56) References Cited

U.S. PATENT DOCUMENTS

| | | | | |
|---|---|---|---|---|
| 2012/0327774 A1* | 12/2012 | Hernandez | ............ | H04L 47/30 370/236 |
| 2014/0140206 A1* | 5/2014 | Hendel | .................. | H04L 47/36 370/229 |
| 2014/0204742 A1* | 7/2014 | Pandit | .................. | H04L 47/263 370/231 |

FOREIGN PATENT DOCUMENTS

| | | |
|---|---|---|
| CN | 101286942 A | 10/2008 |
| CN | 101828177 A | 9/2010 |
| CN | 102075436 A | 5/2011 |

OTHER PUBLICATIONS

Office Action from Chinese Application No. 201410140260.9, dated Nov. 4, 2016.

* cited by examiner

*Primary Examiner* — Andrew Lai
*Assistant Examiner* — Albert Shih
(74) *Attorney, Agent, or Firm* — Zilka-Kotab, PC (57) ABSTRACT

In one embodiment, a system includes a network having one or more devices interconnected therebetween, the network including a first device having a first port and logic integrated with and/or executable by a first processor, the logic being adapted to exchange credit exchange (CE) capabilities between the first port and a second port of a second device in the network, receive a credit grant packet from the second port, the credit grant packet indicating credits granted to the first port, and send one or more packets of data from the first port to the second port, the one or more packets corresponding with the granted credits. Other systems and methods for providing credit-based flow control are described according to more embodiments.

20 Claims, 5 Drawing Sheets

CREDIT-BASED LINK LEVEL FLOW CONTROL AND CREDIT EXCHANGE USING DCBX

BACKGROUND

The present invention relates to data center infrastructure, and more particularly, this invention relates to credit-based link level flow control and credit exchange using Data Center Bridging eXchange (DCBX).

Ethernet port-based flow control is based on a reactive stop-and-go (on-off) mechanism, called PAUSE, as defined in Institute of Electrical and Electronics Engineers (IEEE) standard 802.3x, which is used only after a receiver's buffer backlog exceeds a certain high watermark, sending a PAUSE (i.e., stop) signal to the sender, and sending an UNPAUSE (i.e., go) signal when the receiver's buffer backdrop drops below a low watermark. To ensure that no frame drops caused by buffer overflow(s) occur, the receiver's high watermark must be set at least one bandwidth-delay product (BDP) below the receiver's buffer capacity, thus increasing buffer size requirements. Moreover, for a given threshold setting, an increase in BDP, e.g., due to installing a longer cable between the sender and the receiver, or due to delayed processing of a PAUSE frame, may lead to unwanted frame drops. These issues are exacerbated by continuously increasing line rates (from the original 10 Mb/s per port up to 100 Gb/s and faster) which leads to increasing BDP. Accordingly, it would be beneficial for Ethernet to adopt proactive reservation-based flow control and frame acceptance schemes with a mechanism to guarantee buffer space at the receiver to ensure absence of frame drops independent of BDP.

Interaction between peer ports before data exchange brings in more certainty and better resource utilization. Ethernet does not have such a mechanism for the purpose of catering to specific applications and convergence of Infiniband over Ethernet.

Therefore, Ethernet installations would benefit greatly from a credit-based flow control mechanism to bring in more certainty for transmission.

SUMMARY

In one embodiment, a system includes a network having one or more devices interconnected therebetween, the network including a first device having a first port and logic integrated with and/or executable by a first processor, the logic being adapted to exchange credit exchange (CE) capabilities between the first port and a second port of a second device in the network, receive a credit grant packet from the second port, the credit grant packet indicating credits granted to the first port, and send one or more packets of data from the first port to the second port, the one or more packets corresponding with the granted credits.

In another embodiment, a method for providing credit-based flow control in a network includes exchanging CE capabilities between a first port and a second port, sending a credit grant packet from the second port to the first port, the credit grant packet indicating credits granted to the first port, and sending one or more packets of data from the first port to the second port, the one or more packets corresponding to the granted credits.

According to yet another embodiment, a system includes a network having one or more devices interconnected therebetween, the network including a first device having a first port and logic integrated with and/or executable by a first processor, the logic being adapted to exchange CE capabilities between the first port and a second port in the network, send a credit request packet to the second port, the credit request packet indicating at least one priority of credits to be exchanged and an amount of credits of each of the at least one indicated priority to be exchanged, receive a credit grant packet from the second port, the credit grant packet indicating credits granted to the first port, and send one or more packets of data to the second port, the one or more packets corresponding with the granted credits. The system also includes the second device having the second port and second logic integrated with and/or executable by a second processor, the second logic being adapted to receive the credit request packet from the first port, send the credit grant packet to the first port in response to the credit request packet, and receive the one or more packets of data from the first port.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a network having one or more devices interconnected therebetween, the network including a first device having a first port and logic integrated with and/or executable by a first processor, the logic being adapted to exchange credit exchange (CE) capabilities between the first port and a second port of a second device in the network, receive a credit grant packet from the second port, the credit grant packet indicating credits granted to the first port, and send one or more packets of data from the first port to the second port, the one or more packets corresponding with the granted credits.

In another general embodiment, a method for providing credit-based flow control in a network includes exchanging CE capabilities between a first port and a second port, sending a credit grant packet from the second port to the first port, the credit grant packet indicating credits granted to the first port, and sending one or more packets of data from the first port to the second port, the one or more packets corresponding to the granted credits.

According to yet another general embodiment, a system includes a network having one or more devices interconnected therebetween, the network including a first device having a first port and logic integrated with and/or executable by a first processor, the logic being adapted to exchange CE capabilities between the first port and a second port in the network, send a credit request packet to the second port, the credit request packet indicating at least one priority of credits to be exchanged and an amount of credits of each of the at least one indicated priority to be exchanged, receive a credit grant packet from the second port, the credit grant packet indicating credits granted to the first port, and send one or more packets of data to the second port, the one or more packets corresponding with the granted credits. The system also includes the second device having the second port and second logic integrated with and/or executable by a second processor, the second logic being adapted to receive the credit request packet from the first port, send the credit grant packet to the first port in response to the credit request packet, and receive the one or more packets of data from the first port.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
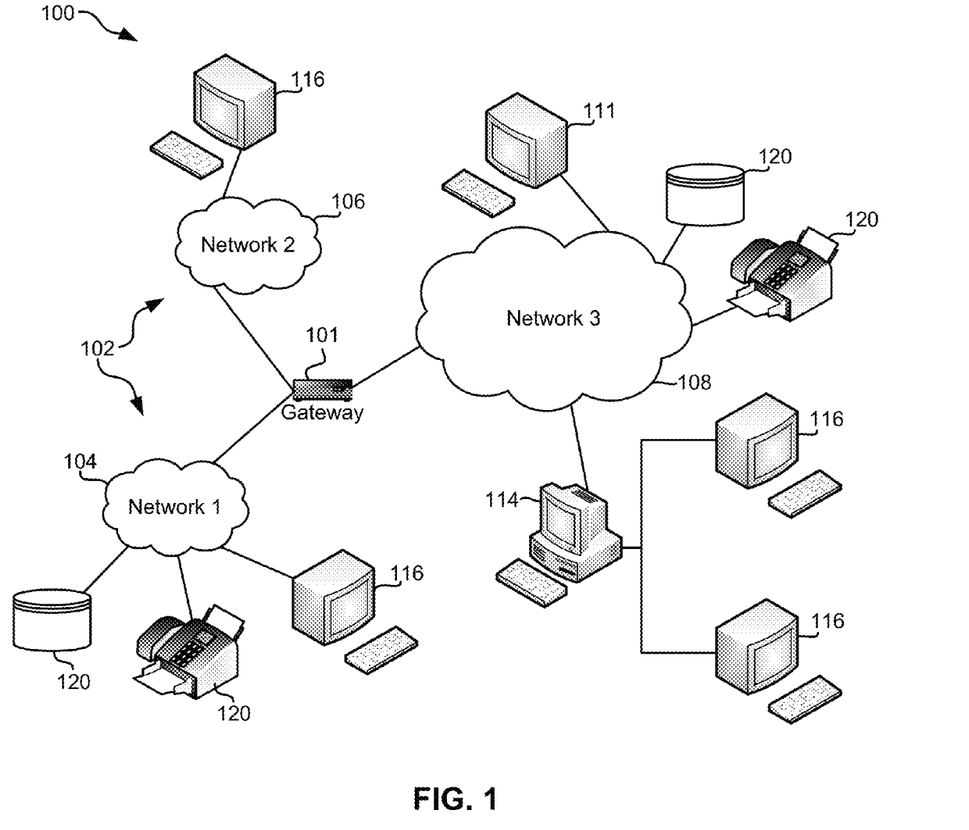
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
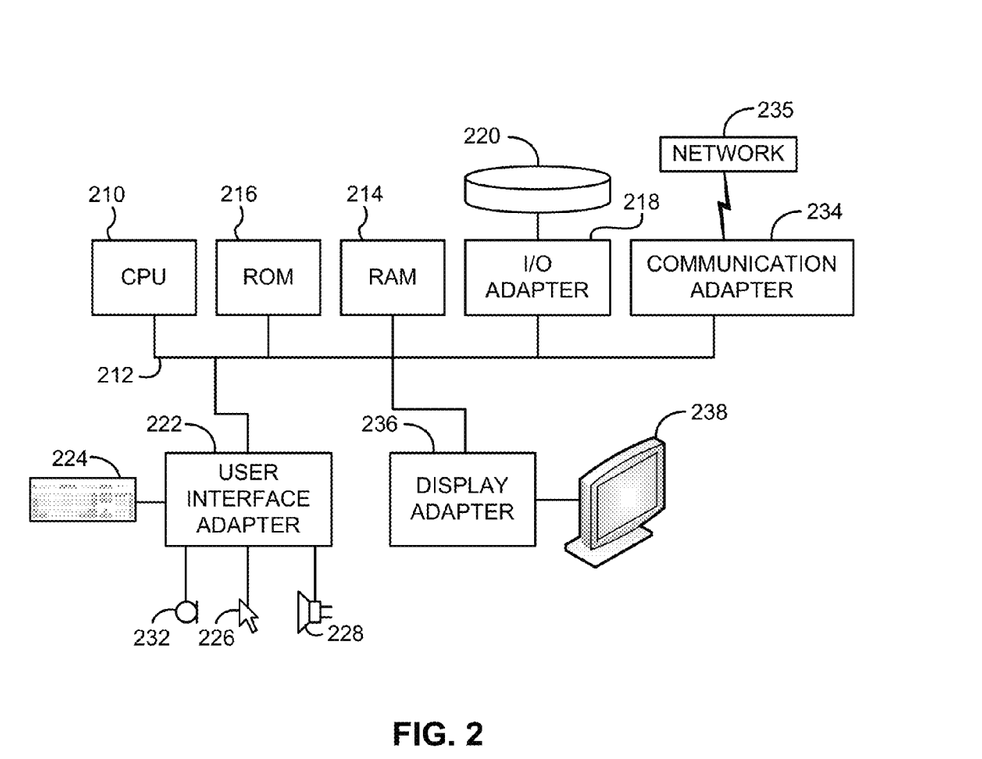
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
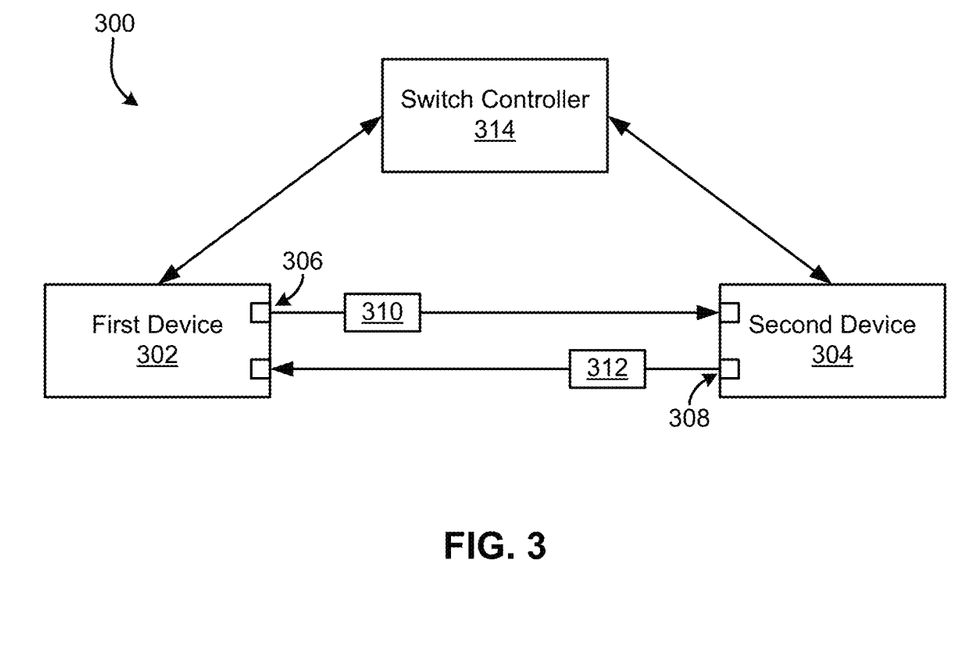
FIG. 3 is a diagram of a simplified network system, according to one embodiment.

Referring now to FIG. 3, a simple device to device interaction in a system 300 is shown according to one embodiment. The first device 302 has access to and/or support one or more ports 306 adapted for receiving and/or transmitting data. The second device 304 has access to and/or support one or more ports 308 adapted for receiving and/or transmitting data. The devices 302, 304 may be switches, routers, servers, or any other suitable networking device, physical or virtual. Either or both of the devices 302, 304 may be capable of communicating with a switch controller 314, such as a software-defined network (SDN) controller, such that transmissions between the devices may be enhanced by the switch controller 314 having awareness of the network.

For the sake of this description, the first device 302 may be considered as a sender of a data packet, and the second device 304 may be considered as a receiver of the data packet. In one embodiment, in order to send a data packet from the first device 302 to the second device 304, two options are possible. In a first option, a packet indicating a credit request 310 is first sent from the first device 302 to the second device 304. In response to the credit request packet 310, the second device 304 may send a packet indicating a credit grant 312 to the first device 302. The amount of credit requested may be a function of the size of the frames to be transmitted.

In a second option, the second device 304, without any prompting or request packet being received, sends out a credit grant packet to any devices connected thereto which may send packets to the second device 304, such as the first device 302.

The amount of credits granted may be a function of the amount of credits requested, transmission buffers available, credits available for exchange, and/or any other suitable factors. In one approach when a credit request is not received, the amount of credits granted by the credit grant packet may be all or a portion of the available credits that are resident on the second device 304. The credit unit (amount of data that may be sent in exchange for one credit) may be a minimum of 8 bits (for example, 256 bits, 512 bits (one quantum of data), 1024 bits, etc.) and a maximum of one maximum transmission unit (MTU), which may be many quanta of data. The credit unit may exceed MTU size when useful for performance optimization, as desired by a user, etc.

In one embodiment a default value of 512 bits for the credit unit may be used, which may be user-adjustable and/or modified by policy, programmed, etc.

Also, a priority value of the packets may be related to an IEEE 802.1P value of the frame to be transmitted, or a class of service (COS) queue priority value. Also, in one approach, a channel identifier (ID), which is optionally included, may be a function of a service tag (S-Tag), source MAC address, or any other programmable parameter.

In order to determine if each of the devices 302, 304 are capable of credit-based flow control, credit exchange (CE) capabilities may be exchanged between ports on each device.

In one embodiment, the data center bridging exchange (DCBX) protocol may be extended and/or modified in order to allow for the exchange of CE capabilities. CE capabilities may include information needed for flow control between peer ports. The information that may be exchanged includes, in one embodiment, a unit of credit exchange (how much data may be transmitted in exchange for each credit), and whether a device has the ability to exchange credits for flow control or not. The unit value may be indicated in a number of chunks of bits, where a chunk length may be from 8 bits up to a maximum credit block size (MAX_CR_BLK).

The MAX_CR_BLK may be MTU size supported, 2548 bytes, or any other number greater than 8 bits. 2548 bytes are adequate to accommodate Fiber Channel over Ethernet (FCoE) frames with security encryption, and therefore may provide an advantage over other sizes.

In addition, optionally, the capability to exchange channeling capabilities or information may also be indicated in the CE capability exchange. Channeling capabilities enable adding channel IDs in a credit exchange frame or a credit exchange tag.

After the exchange of CE capabilities, the credit request packet 310 is sent from the first device 302 to the second device 304. Next, credits are either granted or refused in the credit grant packet 312.

Next, if any credits are granted to the first device 302, data is transmitted from the first device 302 to the second device 304 in an amount consistent with the amount of credit granted. Then, the second device receives the data, and credit accounting is performed to adjust the amount of credits available for managing data forwarding.

Figure 4:
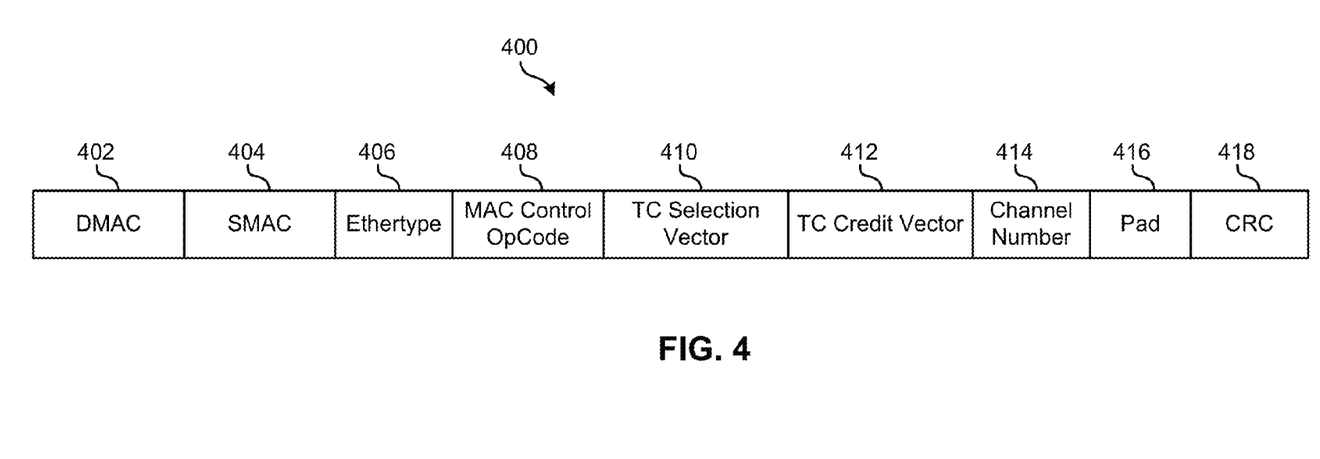
FIG. 4 is a diagram of a credit exchange (CE) frame, according to one embodiment.
Figure 5:
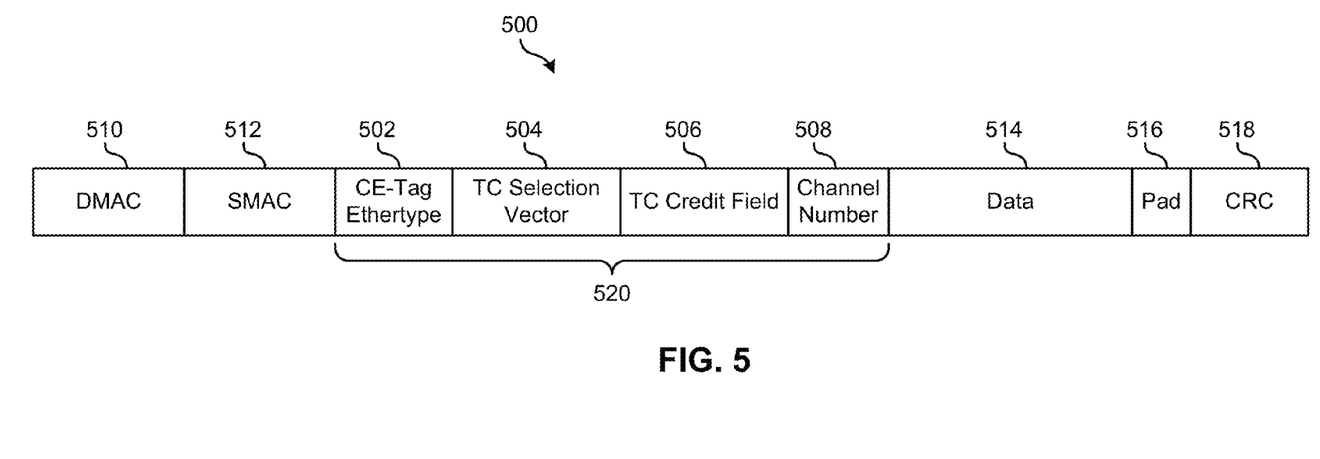
FIG. 5 is a diagram of a frame having a credit exchange tag (CE-Tag), according to one embodiment.

As described in more detail in FIGS. 4-5, a frame, which may be referred to as a Credit Exchange Frame (CE Frame) may be used that has a unique media access control (MAC) Control Ethernet Type, e.g., 0x88XX, where XX are programmable. A new Layer-2 tag, possibly referred to as a "CE-Tag" or credit exchange tag, may also be utilized to designate a packet which includes credit exchange information. To ensure loss-less delivery of frames where the frames are of different priorities, possibly ranging from 0 to 15, a sender (MAC TX) requests credits by sending a new CE frame to the peer port. This frame includes credit requests for multiple priorities. To ensure loss-less delivery of frames of one specific priority, the sender (MAC TX) adds a CE-Tagged frame or piggybacks on the data frame in transmission logic. The CE-Tag includes a request for credits for a single priority and has low overhead. In another embodiment, no request is sent, and the peer port provides any credits which it receives to allow for packet transmission without being prompted.

The peer port (receiver or MAC RX) receives the CE Frame or CE-Tagged frame and interprets the requests for corresponding priorities or priority of credits. In turn, an appropriate amount of credits are issued or provided to the requester device or port in a turn around CE frame or by adding a CE-Tag on a next data frame that is already being transmitted to the requester.

Upon receipt of credits, the sender sends frames or packets for the appropriate and/or allowed priorities as designated by the credits received.

Now referring to FIG. 4, a credit exchange (CE) frame 400 is shown according to one embodiment. The frame 400 may take any format as desired, and the format shown in FIG. 4 is for exemplary purposes only and is not meant to be limiting on the frame formats which may be used.

The frame 400, in this exemplary embodiment, includes a destination media access control (DMAC) address field 402, a source MAC (SMAC) address field 404, an Ethertype field 406, a MAC control operation code (OpCode) field 408, a traffic class (TC) selection vector 410, a TC credit vector 412, an optional channel number field 414, and a cyclic redundancy check (CRC) field 418. Should there be any additional space, a pad 416 may be placed between the channel number field 414 and the CRC field 418.

The DMAC address field 402 may be set to 01:80:C2: 00:00:01, which is standard for multicast packets, in order to identify the packet as a multicast packet. The DMAC address field 402 may be 48 bits in length, or any other suitable length as determined by a user.

The SMAC address field 404 may be used to designate a source of the packet, and may be 48 bits in length, or any other suitable length as determined by a user.

The Ethertype field 406 may be used to designate an Ethertype of the packet. Since CE frames do not currently have a specified Ethertype designation, any such Ethertype that is unoccupied may be used, as long as all devices in the network which will send and/or receive these CE frames understand what this designation is. In one such embodiment, the Ethertype field 406 may be designated as 0x88XX, where "XX" may be standard or programmable, depending on how the user wishes to utilize the field.

The MAC control operation code (OpCode) field 408 may designate whether the packet is a credit request packet or a credit grant packet. This may be accomplished by using bit strings which are not already used for other indications. In one example, 0x0110 may be used to indicate that the packet is a credit request packet, while 0x0111 may be used to indicate that the packet is a credit grant packet.

In some embodiments, a credit request packet may not be sent in order to have credits granted. Instead, the credit grant packet may be sent out to all available devices as soon as the credits are available at any receiving devices.

The TC selection vector 410 may be used to indicate which priorities of credits are being requested or granted (based on the MAC Control OpCode field 408). For each priority of packet available, it may be indicated whether credits for this priority are being requested/granted or not. For example, there may be 16 priorities available from which to assign to any packets, and accordingly there may be 16 bits in the vector, each bit representing whether credits for the corresponding priority are being requested or granted. Of course, the number of priorities available may be more or less than 16, such as 8, 12, 20, 24, etc.

The TC credit vector 412 may be used to indicate how many credits of each priority are being requested or granted (based on the MAC Control OpCode field 408). For each priority of packet available, there may be a number of credits indicated. For example, there may be 16 priorities available from which to assign to the packets being sent, and accordingly there may be 16 places in the vector, each place having a number of bits representing how many credits for the corresponding priority are being requested/granted.

The channel number field 414 may be used, optionally, to indicate a channel number or ID. The channel ID may indicate multi-tenancy on the port and/or a virtual grouping of the one or more packets that are to be sent. In one such example, this channel number may be related to and/or based on a VLAN ID for the one or more packets that are to be sent. Information about multi-tenancy on the port may be included in order to allow for additional processing to be performed for the port when desired by a user or policy. In one approach, this field may be 16 bits in length, but may be more or less as desired. A VLAN ID is typically 12 bits, and the channel ID may mimic these 12 bits or may modify or add to these 12 bits to include other information.

Now referring to FIG. 5, a credit exchange tag (CE-Tag) 520 is shown in a standard Ethernet frame 500, according to one embodiment. The CE-Tag 520 may be used to indicate, in conjunction with a typical or standard Ethernet frame 500, an amount of credits being requested/granted for a single priority. The CE-Tag 520 includes a CE Tag Ethertype field 502, a TC selection vector 504, a TC credit field 506, and an optional channel number field 508.

The CE-Tag 520 may be added to a packet which is already going to be sent from one device to another device. In this way, a full CE frame does not need to be sent between the devices, and instead a packet which is already being sent may be modified to include the CE-Tag 520 and thereby reduce the amount of traffic sent between the devices, as the CE-Tag 520 may piggyback on traffic already being sent.

The frame 500 may include many standard fields, such as the DMAC address field 510, which may be used to indicate a destination address for the packet, the SMAC address field 512, which may be used to indicate a source address for the packet, the data field 514, which may be used to carry a payload or Ethernet frame data, an optional pad 516, which may be included to fill up any remaining space in the frame 500, and a CRC 518, which may be included for error correcting, as would be understood by one of skill in the art.

The CE Tag Ethertype field 502 may be used to indicate that the tag is for credit exchange, and may be programmable or standard and may indicate that the packet is for a credit request or a credit grant. The TC selection vector 504 may be used to indicate which priority of credit out of the available priorities is being requested/granted. In one approach, this field may be 16 bits in length, but may be more or less as desired.

Also, the TC credit field 506 may be used to indicate how many credits are being granted/requested from the designated priority indicated in the TC selection vector 504. In one approach, this field may be 16 bits in length, but may be more or less as desired.

The optional channel number field 508 may be used to indicate a channel number or ID. This channel number may be related to and/or based on a VLAN ID for the packet that is to be sent. In one approach, this field may be 16 bits in length, but may be more or less as desired.

The DCBX protocol may be extended to advertise the CE capabilities of any device which utilizes the DCBX protocol to exchange information. In accordance with this process, an application protocol type-length-value (TLV) may be defined, which may be referred to as a "CET" TLV. This TLV may be originated by a physical port on a peer to peer basis between the originating port and a peer port to which exchanges may be made. Switching devices downstream may in turn, exchange CET TLV messages on all of their DCBX member ports to their peer devices, in an optional embodiment.

Therefore, after complete convergence of a network, all devices in a path from source device or port to destination device or port are capable of understanding the credit exchange capabilities of their peer ports and performing credit exchange with their peer ports.

Figure 6:
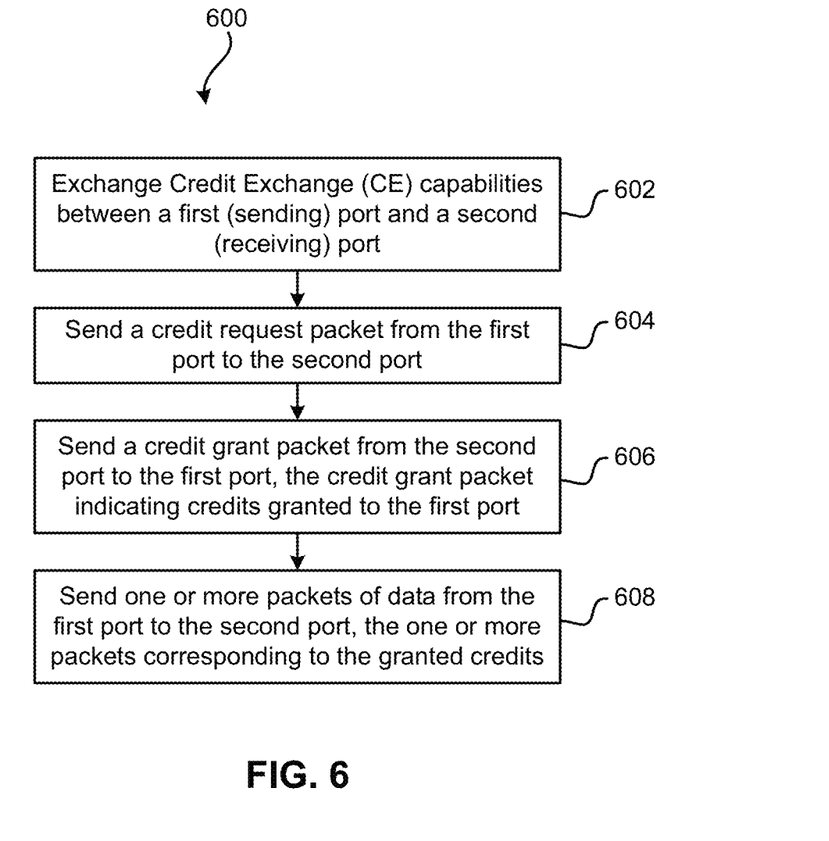
FIG. 6 is a flowchart of a method, according to one embodiment.

Now referring to FIG. 6, a method 600 for credit-based flow control in a network is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by an endpoint, a vSwitch hosted by a server, a server, a switch, a switch controller (such as a SDN controller, OpenFlow controller, etc.), a credit manager, a traffic controller, a processor, e.g., a CPU, an application specific integrated circuit (ASIC), a field programmable gate array (FPGA), etc., a network interface card (NIC), a virtual NIC, a virtualization platform, or any other suitable device or component of a network system or fabric.

In operation 602, CE capabilities are exchanged between a first (sending) port and a second (receiving) port. In one embodiment, the CE capabilities may be exchanged using DCBX.

In another embodiment, the CE capabilities may comprise indication of an ability to participate in credit-based flow control and exchange credits (e.g., whether or not the port is capable if understanding CE), indication of an ability to understand a channel ID included in a CE frame and/or a CE-Tag (e.g., whether the port understands when a channel ID is included), and a unit of credit exchange (an amount of data that may be sent for each credit exchanged).

In one approach, the unit of credit exchange may allow for at least 8 bits of data to be sent from the first port to the second port for each credit, and up to one MTU of data. In a specific embodiment, each credit may allow for 2548 bytes of data to be sent.

In operation 604, a credit request packet is sent from the first port to the second port. This operation is optional, as it is not required that the request be sent. Instead, the second port may send a credit grant packet at any time with or without a credit request packet first being sent.

In one approach, the credit request packet may indicate at least one priority of credits to be exchanged and an amount of credits of each of the at least one indicated priority to be exchanged.

In operation 606, a credit grant packet is sent from the second port to the first port, the credit grant packet indicating credits granted to the first port. In one embodiment, the credit grant packet is sent in response to the credit request packet.

In one approach, the credit grant packet may indicate at least one priority of credits granted to the first port (e.g., one or more of the 16 available priorities) and an amount of credits of each of the at least one indicated priority granted to the first port (e.g., how many credits of each priority are being granted to the first port).

In further approaches, the credit grant packet may include credits only for those packets which have a valid channel ID (this information may be included in the credit request packet or discovered in some other way). Furthermore, the credits may be issued on a per virtual port basis, or on any other basis for which a parameter may be provided and verified prior to issuance of the credits to the second port.

In operation 608, one or more packets of data are sent from the first port to the second port, the one or more packets corresponding to the granted credits.

An amount of the one or more packets of data corresponds with the amount of credits of each of the at least one indicated priority granted to the first port. Furthermore, a priority of the one or more packets corresponds with the at least one priority of credits granted to the first port. In this way, only a certain amount of data that corresponds with an amount of credits granted is sent. Furthermore, only data having a priority which matches the priority of the granted credit(s) may be sent.

In one embodiment, the credit grant packet and the credit request packet may each comprise a DMAC field for indicating a destination of the packet, a SMAC field for indicating a source of the packet, an Ethertype field for indicating that the packet is a CE packet, a MAC OpCode for indicating whether the packet is a credit grant packet or a credit request packet, a TC selection vector for indicating which priorities of credits are being requested or granted, a TC credit vector for indicating how many of each priority of credit is being requested or granted, and a CRC field for correcting errors.

In an alternate embodiment, the credit grant packet and the credit request packet may each comprise a CE-Tag, the CE-Tag comprising an Ethertype field for indicating that the packet is a CE packet, a TC selection vector for indicating a selected priority of credit which is being requested or granted, and a TC credit vector for indicating how many of the selected priority of credit is being requested or granted.

In one embodiment, a credit aging duration may be negotiated between the first port and the second port during the CE capabilities exchange. The credit aging duration may be determined based on one or more factors, such as a speed of the link between the first and second port, a distance between the ports, a bit size of the flow credits, etc. In another embodiment, a timer is started to time an age of the flow credits possessed by the second port.

The method 600 may be embodied in a system or computer program product, as would be understood by one of skill in the art. For example, a system may comprise a network comprising one or more devices interconnected therebetween, the network having a first device comprising a first port and logic integrated with and/or executable by a first processor. The logic maybe adapted to exchange CE capabilities between the first port and a second port in the network, send a credit request packet to the second port, the credit request packet indicating at least one priority of credits to be exchanged and an amount of credits of each of the at least one indicated priority to be exchanged, receive a credit grant packet from the second port, the credit grant packet indicating credits granted to the first port, and send one or more packets of data to the second port, the one or more packets corresponding with the granted credits. The network may also include the second device comprising the second port and second logic integrated with and/or executable by a second processor. The second logic may be adapted to receive the credit request packet from the first port, send the credit grant packet to the first port in response to the credit request packet, and receive the one or more packets of data from the first port.

In some embodiments, the CE capabilities may be exchanged using DCBX and may comprise indication of an ability to participate in credit-based flow control and exchange credits, indication of an ability to understand a channel ID included in a CE frame and/or a CE-Tag, and a unit of credit exchange. Also, the credit grant packet may indicate at least one priority of credits granted to the first port and an amount of credits of each of the at least one indicated priority granted to the first port.

In some embodiments, after the second port has successfully forwarded packets received by the second port (packets which are forwarded to the second port from the first port), the first port may receive an amount of credits proportional to an amount of packets successfully forwarded by the second port. In one embodiment, in order to track when the packets are successfully forwarded by the second port, every quantum of data successfully consumed by a NIC driver of the second port (which is used to forward packets away from the second port, e.g., to their next hop) may be monitored by the switch controller or some other credit generator (such as a credit manager, gateway, etc.). The switch controller or credit generator may then replenish the first port with credits proportional to the amount of data consumed by the NIC driver.

In addition, unused credits of the first or second port may be expired as their age reaches the credit aging duration, as negotiated during CE capability exchange. Thereafter, the timer for expiring stale credits may be restarted.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a first device comprising a first port and logic integrated with and/or executable by a first processor, the logic being configured to cause the processor to:
exchange credit exchange (CE) capabilities between the first port and a second port of a second device via a network connecting the first and second devices;
receive a credit grant packet from the second port, the credit grant packet indicating:
credits granted to the first port, wherein more than one priority is associated with the credits granted to the first port, wherein each credit is associated with a single priority; and
an amount of credits of each of the more than one priority,
wherein the more than one priority is related to an IEEE 802.1P value of packets, a class of service (COS) queue priority value of packets, or both,
wherein the credit grant packet comprises:
an Ethertype field that indicates that the packet is a grant CE packet;
a traffic class (TC) selection vector that indicates a selected priority of credit which is being granted, the TC selection vector comprising a predetermined number of bits equaling a number of a plurality of priorities assignable to packets, each bit in the TC selection vector corresponding to one of the plurality of priorities; and
a TC credit vector that indicates how many credits of the selected priority of credit are being granted, the TC credit vector comprising a predetermined number of fields equaling the number of the plurality of priorities, each field having a predetermined number of bits for indication of a number of credits being granted for a corresponding priority; and send one or more packets of data from the first port to the second port, an amount of data in the one or more packets corresponding with at least some of the granted credits, and a priority of the one or more packets corresponding to a priority of the at least some of the granted credits.

2. The system as recited in claim 1, wherein the more than one priority is related to the IEEE 802.1P value of packets to be transmitted from the first port to the second port, and wherein the credit grant packet comprises a channel number field that indicates a channel identifier (ID) that includes information about multi-tenancy on the second port.

3. The system as recited in claim 1, wherein the credit grant packet is received without prompting, and wherein the credit grant packet indicates all available credits of each priority at the second port.

4. The system as recited in claim 1, wherein the CE capabilities are exchanged using Data Center Bridging eXchange (DCBX), and wherein the credit grant packet is a data packet already scheduled to be sent from the second port to the first port and includes a CE-Tag stored to a header of the credit grant packet, the CE-Tag comprising the Ethertype field, the TC selection vector, and the TC credit vector.

5. The system as recited in claim 1, wherein the CE capabilities comprise:
   indication of an ability to participate in credit-based flow control and exchange credits;
   indication of an ability to understand a channel identifier (ID) included in a credit exchange (CE) frame and/or a credit exchange tag (CE-Tag); and
   a unit of credit exchange.

6. The system as recited in claim 1, wherein the logic is further configured to:
   send a credit request packet to the second port prior to receiving the credit grant packet, the credit request packet indicating:
      at least one priority of credits to be exchanged; and
      an amount of credits of each of the at least one indicated priority to be exchanged,
   wherein the credit grant packet is received in response to the credit request packet, and
   wherein the credit grant packet indicates available credits at the second port in accordance with the at least one priority of credits to be exchanged in the amount of credits to be exchanged according to the credit request packet.

7. The system as recited in claim 6, wherein the credit request packet further comprises a channel identifier (ID) for indicating a virtual grouping of packets to be sent and multi-tenancy on the second port, and wherein the channel ID is derived as a function of a service tag (S-Tag).

8. The system as recited in claim 6, wherein the credit request packet comprises:
   a destination media access control (DMAC) field for indicating a destination of the packet;
   a source media access control (SMAC) field for indicating a source of the packet;
   an Ethertype field for indicating that the packet is a request CE packet;
   a media access control (MAC) operation code (OpCode) for indicating that the packet is a credit request packet;
   a traffic class (TC) selection vector that indicates which priorities of credits are being requested, the TC selection vector comprising the predetermined number of bits equaling the number of the plurality of priorities assignable to packets, each bit in the TC selection vector corresponding to one of the plurality of priorities;
   a TC credit vector that indicates how many credits of each priority of credit is being requested, the TC credit vector comprising the predetermined number of fields equaling the number of the plurality of priorities, each field having the predetermined number of bits for indication of a number of credits being requested for a corresponding priority;
   a channel identifier (ID) that indicates multi-tenancy on the first port and is derived as a function of a service tag (S-Tag); and
   a cyclic redundancy check (CRC) field for correcting errors.

9. The system as recited in claim 6, wherein the credit request packet is a data packet already scheduled to be sent from the first port to the second port and comprises a request CE-Tag stored in a header of the credit request packet, the request CE-Tag comprising:
   an Ethertype field for indicating that the packet is a request CE packet;
   a traffic class (TC) selection vector that indicates a selected priority of credit which is being requested, the TC selection vector comprising the predetermined number of bits equaling the number of the plurality of priorities assignable to packets, each bit in the TC selection vector corresponding to one of the plurality of priorities; and
   a TC credit vector that indicates how many credits of the selected priority of credit are being requested, the TC credit vector comprising the predetermined number of fields equaling the number of the plurality of priorities, each field having the predetermined number of bits for indication of a number of credits being requested for a corresponding priority.

10. A method for providing credit-based flow control in a network, the method comprising:
   exchanging credit exchange (CE) capabilities between a first port and a second port;
   sending a credit grant packet from the second port to the first port, the credit grant packet indicating:
      credits granted to the first port, wherein more than one priority is associated with the credits granted to the first port, wherein each credit is associated with a single priority; and
      an amount of credits of each of the more than one priority,
   wherein the more than one priority is related to an IEEE 802.1P value of packets, a class of service (COS) queue priority value of packets, or both,
   wherein the credit grant packet comprises a grant CE-Tag, the grant CE-Tag comprising:
      an Ethertype field that indicates that the packet is a grant CE packet;
      a traffic class (TC) selection vector that indicates a selected priority of credit which is being granted, the TC selection vector comprising a predetermined number of bits equaling a number of a plurality of priorities assignable to packets, each bit in the TC selection vector corresponding to one of the plurality of priorities; and
      a TC credit vector that indicates how many credits of the selected priority of credit are being granted, the TC credit vector comprising a predetermined number of fields equaling the number of the plurality of priorities, each field having a predetermined number of bits for indication of a number of credits being granted for a corresponding priority; and receiving one or more packets of data from the first port at the second port, an amount of data in the one or more packets corresponding to at least some of the granted credits, and a priority of the one or more packets corresponding to a priority of the at least some of the granted credits.

11. The method as recited in claim 10, wherein the more than one priority is related to the IEEE 802.1P value of packets to be transmitted from the first port to the second port, and wherein the grant CE-tag comprises a channel number field that indicates a channel identifier (ID) that includes information about multi-tenancy on the second port.

12. The method as recited in claim 10, wherein the credit grant packet is sent without prompting, and wherein the credit grant packet indicates all available credits of each priority at the second port.

13. The method as recited in claim 10, wherein the CE capabilities are exchanged using Data Center Bridging eXchange (DCBX), and wherein the credit grant packet is a data packet already scheduled to be sent from the second port to the first port and includes a CE-Tag stored to a header of the credit grant packet, the CE-Tag comprising the Ethertype field, the TC selection vector, and the TC credit vector.

14. The method as recited in claim 10, wherein the CE capabilities comprise:
  indication of an ability to participate in credit-based flow control and exchange credits;
  indication of an ability to understand a channel identifier (ID) included in a credit exchange (CE) frame and/or a credit exchange tag (CE-Tag); and
  a unit of credit exchange.

15. The method as recited in claim 14, wherein the unit of credit exchange allows for at least 8 bits of data to be sent from the first port to the second port for each credit, wherein the channel ID is derived as a function of a service tag (S-Tag) and indicates a virtual grouping of packets to be sent and multi-tenancy on the second port.

16. The method as recited in claim 10, further comprising receiving a credit request packet from the first port at the second port prior to sending the credit grant packet, the credit request packet indicating:
  at least one priority of credits to be exchanged; and
  an amount of credits of each of the at least one indicated priority to be exchanged,
  wherein the credit grant packet is sent in response to receiving the credit request packet, and
  wherein the credit grant packet indicates available credits at the second port in accordance with the at least one priority of credits to be exchanged in the amount of credits to be exchanged according to the credit request packet.

17. The method as recited in claim 16, wherein the credit request packet comprises:
  a destination media access control (DMAC) field for indicating a destination of the packet;
  a source media access control (SMAC) field for indicating a source of the packet;
  an Ethertype field for indicating that the packet is a request CE packet;
  a media access control (MAC) operation code (OpCode) for indicating that the packet is a credit request packet;
  a traffic class (TC) selection vector that indicates which priorities of credits are being requested, the TC selection vector comprising the predetermined number of bits equaling the number of the plurality of priorities assignable to packets, each bit in the TC selection vector corresponding to one of the plurality of priorities;
  a TC credit vector that indicates how many credits of each priority of credit is being requested, the TC credit vector comprising the predetermined number of fields equaling the number of the plurality of priorities, each field having the predetermined number of bits for indication of a number of credits being requested for a corresponding priority
  a channel identifier (ID) that indicates multi-tenancy on the first port and is derived as a function of a service tag (S-Tag); and
  a cyclic redundancy check (CRC) field for correcting errors.

18. The method as recited in claim 16, wherein the credit request packet is a data packet already scheduled to be sent from the first port to the second port and comprises a request CE-Tag stored in a header of the credit request packet, the request CE-Tag comprising:
  an Ethertype field for indicating that the packet is a request CE packet;
  a traffic class (TC) selection vector that indicates a selected priority of credit which is being requested, the TC selection vector comprising the predetermined number of bits equaling the number of the plurality of priorities assignable to packets, each bit in the TC selection vector corresponding to one of the plurality of priorities; and
  a TC credit vector that indicates how many credits of the selected priority of credit are being requested, the TC credit vector comprising the predetermined number of fields equaling the number of the plurality of priorities, each field having the predetermined number of bits for indication of a number of credits being requested for a corresponding priority.

19. A system, comprising:
  a first device comprising a first port and logic integrated with and/or executable by a first processor, the logic being configured to cause the first processor to:
    exchange credit exchange (CE) capabilities between the first port and a second port of a second device via a network connecting the first and second devices;
    send a credit request packet to the second port, the credit request packet indicating:
      at least one priority of credits to be exchanged; and
      an amount of credits of each of the at least one indicated priority to be exchanged,
    wherein the credit request packet comprises:
      a destination media access control (DMAC) field for indicating a destination of the packet;
      a source media access control (SMAC) field for indicating a source of the packet;
      an Ethertype field for indicating that the packet is a request CE packet;
      a media access control (MAC) operation code (OpCode) for indicating that the packet is a credit request packet;
      a traffic class (TC) selection vector that indicates which priorities of credits are being requested, the TC selection vector comprising a predetermined number of bits equaling a number of a plurality of priorities assignable to packets, each bit in the TC selection vector corresponding to one of the plurality of priorities;

a TC credit vector that indicates how many credits of each priority of credit is being requested, the TC credit vector comprising a predetermined number of fields equaling the number of the plurality of priorities, each field having the predetermined number of bits for indication of a number of credits being requested for a corresponding priority;

a channel identifier (ID) that indicates multi-tenancy on the first port and is derived as a function of a service tag (S-Tag); and a cyclic redundancy check (CRC) field for correcting errors;

receive a credit grant packet from the second port, the credit grant packet indicating:

credits granted to the first port, wherein more than one priority is associated with the credits granted to the first port, wherein each credit is associated with a single priority; and an amount of credits of each of the more than one priority, wherein the more than one priority is related to an IEEE 802.1P value of packets, a class of service (COS) queue priority value of packets, or both, wherein the credit grant packet comprises:

an Ethertype field that indicates that the packet is a grant CE packet;

a traffic class (TC) selection vector that indicates a selected priority of credit which is being granted, the TC selection vector comprising a predetermined number of bits equaling a number of a plurality of priorities assignable to packets, each bit in the TC selection vector corresponding to one of the plurality of priorities; and a TC credit vector that indicates how many credits of the selected priority of credit are being granted, the TC credit vector comprising a predetermined number of fields equaling the number of the plurality of priorities, each field having a predetermined number of bits for indication of a number of credits being granted for a corresponding priority; and send one or more packets of data to the second port, an amount of data in the one or more packets corresponding with at least some of the granted credits, and a priority of the one or more packets corresponding to a priority of the at least some of the granted credits; and the second device comprising the second port and second logic integrated with and/or executable by a second processor, the second logic being configured to cause the second processor to:

receive the credit request packet from the first port;

send the credit grant packet to the first port in response to the credit request packet; and receive the one or more packets of data from the first port.

20. The system as recited in claim 19, wherein the CE capabilities are exchanged using Data Center Bridging eXchange (DCBX) and comprise:

indication of an ability to participate in credit-based flow control and exchange credits;

indication of an ability to understand a channel identifier (ID) included in a credit exchange (CE) frame and/or a credit exchange tag (CE-Tag), the channel ID including information about multi-tenancy on an associated port; and a unit of credit exchange.

* * * * *